Figure 1:
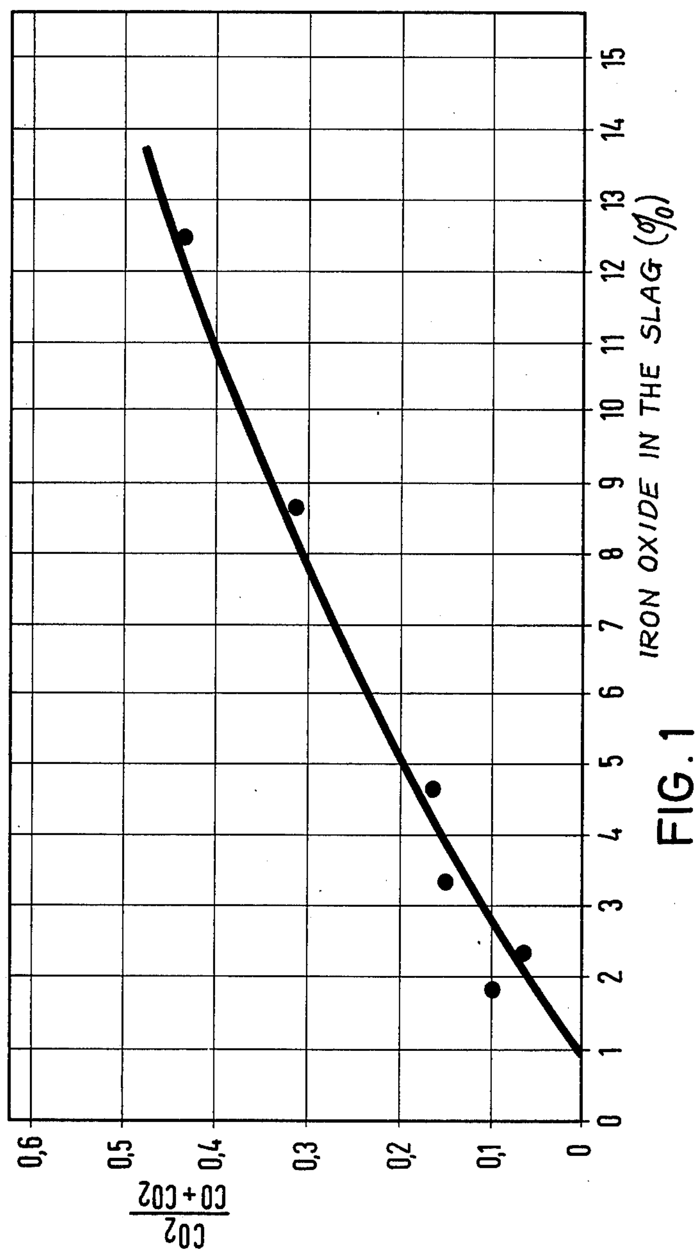

United States Patent [19]

Knüppel et al.

[11] 4,123,259

[45] Oct. 31, 1978

[54] METHOD FOR SUPPLYING THERMAL ENERGY TO STEEL MELTS

[75] Inventors: Helmut Knüppel; Karl Brotzmann; Hans G. Fassbinder, all of Sulzbach-Rosenberg, Germany

[73] Assignee: Eisenwerk-Gesellschaft Maximilianshutte mbH, Sulzbach-Rosenberg, Germany

[21] Appl. No.: 799,029

[22] Filed: May 20, 1977

[51] Int. Cl.[2] .................................... C21C 5/34

[52] U.S. Cl. .................................... 75/60; 75/59

[58] Field of Search .................................... 75/59, 60

[56] References Cited

U.S. PATENT DOCUMENTS 3,706,549 12/1972 Knüppel .................................... 75/60

*Primary Examiner*—P. D. Rosenberg

*Attorney, Agent, or Firm*—Lawrence I. Field

[57] ABSTRACT

A procedure is described for supplying thermal energy to a steel melt by burning a fuel in a melt containing at most 0.10% carbon, by means of oxygen. Both the fuel and the oxygen are introduced into the steel melt beneath the surface of the melt. The method permits an increase in the scrap or other iron carriers, (ore, pellets, etc.) which can be processed. Apparatus for carrying out the process is also described.

2 Claims, 2 Drawing Figures

METHOD FOR SUPPLYING THERMAL ENERGY TO STEEL MELTS

This invention relates to a method for supplying thermal energy to steel melts, wherein a fuel, preferably carbon and/or hydrocarbons, is burned by means of oxygen and the resulting combustion gases are blown through the melt to furnish heat.

Within the scope of large scale industrial steel productions, approaches are presently known for supplying thermal energy to the steel melts. One approach consists in using electrical energy. The supply of energy by electrical arc and induction furnaces has been found practical in this field. The disadvantage of this procedure for melting and heating steel consists on one hand in the relatively long time between charges and on the other in the high cost of electrical power and the economic considerations related thereto.

In a second approach to supplying heat, a fuel is burned in a space above the metal bath in an oxidizing atmosphere, and the heat so released is conveyed to the metal bath by radiation, convection or conduction. This is the basis essentially for the open hearth steel making process as carried out, for instance, in a Siemens-Martin furnace.

Presently most of the steel production is obtained from convertor processes in which almost all of the heat used comprises that which is generated by the combustion of the oxidizable elements present in the pig iron to be refined. Depending on the composition of the pig iron and using pure oxygen, scrap in the amount of about 20 to 30% of the charge weight may be melted during the refining process. It is important in the production of the converter steel to increase the scrap proportion depending on its price and availability. Two methods are being used in practical operation. In one, the scrap may be preheated prior to the pig iron being placed into the convertor. This allows one to increase the scrap proportion by a maximum or in an amount of approximately 8%, but one suffers the drawback of reduced productivity and increased wear of refractory material. A second process consists in post burning of carbon monoxide in the convertor space. The CO is generated in the iron bath during the refining process. The relatively short refining time and the maximum permissable exhaust gas temperature consistent with the protection of the refractory convertor lining limit the increase of the scrap proportion to about 3%.

The addition of a fuel such as carbon to the iron bath, this fuel being burned by the introduction of corresponding quantities of oxygen, provides no gain in utilizable heat because the heat of reaction generated under the conventional conditions of steel making is barely enough to raise the temperature of the reaction gas of this combustion, principally CO and $H_2$, to that of the liquid steel in the convertor.

The present invention addresses the task of creating a process for supplying heat to the steel bath by burning a fuel, preferably carbon and/or hydrocarbons, by means of oxygen under the ordinary conditions prevailing in conventional steel-melt refining vessels.

The solution of this problem is based on the process of the present invention, namely that substances containing carbon and/or hydrocarbons are burned by means of oxygen and in that the combustion gases, which consist at least in part of $CO_2$ and $H_2O$, are blown through a steel melt containing no more than 0.10% of carbon content. It was surprisingly found that to the contrary of all prior opinion, there are conditions in the steel melt under which a combustion gas is produced, which is endowed with an appreciably higher degree of oxidation than corresponding to the equilibrium state with the melt.

Pursuant to this teaching of the invention, it was possible to burn the fuel, preferably carbon and/or hydrocarbons by means of oxygen in the bath to a high percentage of $CO_2$ and $H_2O$; thermal energy beyond that required to heat the reaction gases is released in this stage of oxidation and is used to raise the temperature of the melt.

It is particularly advantageous to supply the fuel and the oxygen through appropriate burners mounted in the refractory lining below the bath surface.

However, the invention is not restricted to these burners and their arrangement. For instance, other burners may be used, such as direct the combustion gas with high momentum into the bath and thereby make it penetrate the melt.

Surprisingly, when introducing the fuels and the oxygen into a melt by means of said burners, it becomes feasible for an exhaust gas consisting of about 50% of $CO_2$ to leave the steel bath when the iron oxide content of the slag is about 10 to 15% and the oxygen content of the steel is about 0.05%. A $CO_2$ content of about 7% corresponds to this oxygen content of bath and slag under equilibrium conditions.

At higher oxygen content in the melt, which is related to correspondingly lower carbon contents, one encounters conditions substantially preventing a reduction of the oxidizing exhaust gases, where nevertheless the heat from the combustion process is transferred to the bath.

All substances containing carbon or hydrocarbons may be used as fuels, though those are preferred which have higher heats of combustion. For instance, ground carbon or coke, including lignite ar carbonized lignite, may be used. Fuel and heavy fuel oil, or heavy oil fractions obtained when refining petroleum may be used as hydrocarbons. Furthermore, gaseous hydrocarbons such as natural gas, propane, coke oven gases and similar substances may also be used.

Figure 2:
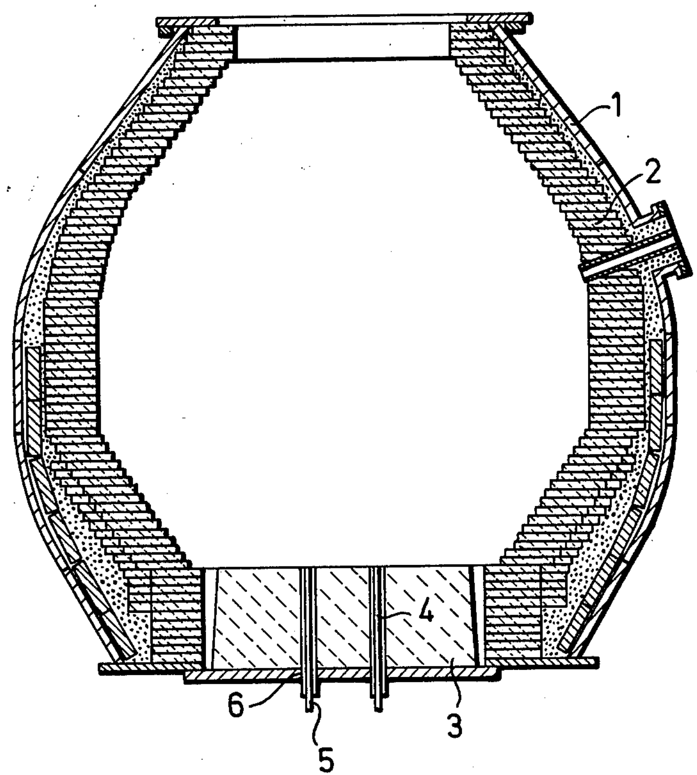

To better explain the process of the invention, reference may be had to the drawings in which:

FIG. 1 is a graph showing the $CO_2$ content in the convertor exhaust gas in relation to the iron oxide content of the convertor slag; and FIg. 2 is a section through a 30 ton convertor for implementing the process.

The relationship shown in FIG. 1 resulted from the application of the process of the invention in a convertor with a steel melt of about 1 ton. Heavy fuel oil and oxygen in a ratio of 1.2 $Nm^3$ (cubic meters measured under standard conditions of pressure and temperature) of $O_2$ per liter of oil are supplied to this convertor below the bath surface. The figure shows that the process can be applied for an iron oxide content of the slag of about 5% for which the carbon content in the steel bath is about 0.10%, the thermal efficiency then however only amounting to about 20%. High thermal efficiency and optimum effectiveness is only achieved if the iron oxide content of the slag is near or above 10%. This means that the principal application for the invention is in steel melts with carbon contents of 0.05% of less. It is essential to the present invention therefore that first the carbon content be lowered to a level in the vicinity of about 0.05% for the purpose of achieving efficient use of the supplied thermal energy before the measures of the invention for supplying the heat are effected.

It is of significance for the invention that the fuel and the oxygen first react in the presence of widespread oxidation of the fuel. It is necessary therefore to feed the fuel and the oxygen through equipment first permitting a reaction of fuel and oxygen.

It may be appropriate to introduce additional carbonaceous and hydrocarbonaceous media separately into the melt or slag for the purpose of obtaining metallurgical reactions, and independently of the heating achieved by the flame penetrating into the metal bath. Such a step may be significant when on one hand the burner(s) is (are) operated under optimum conditions for the heating procedure, but where a change in the composition of the steel bath toward a higher degree of oxidation must be averted. The separate introduction of carbonaceous materials allows maintaining the degree of oxidation of the melt at a defined level while permitting the supply of thermal energy so that it is at maximum efficiency.

Not only is the process of the invention outstandingly suited to increasing the proportion of the scrap and to simultaneously melt other cooling means such as ore and iron pellets in the ordinary convertor processes, but it further offers the possibility of carrying out continuous steel production. Thus first a pig iron melt may be refined to a low carbon content of not more than 0.10% as prescribed by the invention, in a refining vessel, whereupon iron carriers, for instance scrap, pellets, ore and mixtures thereof are fed continuously to the melt. In order to melt these iron carriers, appropriate amounts of fuel and oxygen are supplied to the steel bath.

The invention will now be explained in further detail by means of examples of preferred embodiments of the process of this invention, and of a description of a 30 ton convertor for the implementation of the process.

FIG. 2 depicts diagrammatically a conventional, symmetrical convertor comprising a metal plate casing 1 and a refractory masonry lining 2 with exchangeable bottom 3, into which are mounted tuyeres 4 in said refractory masonry. (See FIG. 8 of U.S. Pat. No. 3,706,549 issued Dec. 19, 1972). Preferably tuyeres 4 are of concentric pipe design. At least two pipes 5, 6 form one tuyere 4. Inner pipe 5 is used for the oxygen supply, while a protective medium passes through the annular gap between inner pipe 5 and outer pipe 6 during the refining process during which no fuel is supplied. If the carbon content at the melt is sufficiently low, this protective medium, for instance propane, can be replaced by a fuel, for instance fuel oil.

This tuyere represents the simplest design of a combined refining-burning tuyere. These tuyeres frequently comprise more than two pipes in concentric arrangement and in particular where continuous fuel supply is utilized, are equipped with a special annular gap for said fuel supply.

The 30 ton convertor shown in FIG. 2 was equipped with six tuyeres 4. As already stated, oxygen flowed through inner pipe 5 or tuyere 4 and propane acting as protective medium for this refining tuyere flowed through the annular gap between inside pipe 5 and outside pipe 6 during the refining period. The amount of propane was 3% by volume with respect to the amount of oxygen.

The tuyere supply of propane takes place in a manner known per se by means of a control valve (not shown) and which is provided with one separate outlet for each tuyere and therefore is capable to provide the same amount of propane to each tuyere. During the heating period following refining, the inlet to this control valve was closed to the propane supply and connected to the oil supply. A light fuel oil with a heat content of 10,000 kcal/kg and a C/H ratio of 12:2 was used. The oil supply pressure was so selected that the valve operated in the most favorable control range for the desired oil transmission of 60 kg/min and ensured an equal distribution of this oil to the individual tuyeres. The supply pressure of the oil was 12 atm. gauge upstream and 5 atm. gauge downstream of the valve. Twenty seconds prior to termination of heating, the oil supply was stopped and a propane supply at a pressure of 8 atm. gauge was again connected to the control valve. About 20 seconds were required to displace the oil from the lines and thus quantitatively expend it. The oil used was preheated to 60° C. to prevent cooling of the propane pipe lines. This step eliminated any possible condensation of the propane gas.

As described below two charges were produced by means of the above described fuel supply technique to the 30 ton convertor.

In the first melt, the proportion of scrap was selected 4% higher than is conventional in the ordinary practice of steel making. For a steel bath composition of C=0.03% and P=0.040%, the expected final temperature of the charge was too low, amounting only to 1,550° C. The slag was taken off the molten metal and the molten metal was heated according to the invention. During this post-treatment of 3 minutes, 180 $Nm^3$ of $O_2$ and 300 kg of lime and 120 kg of fuel oil were supplied through the bottom tuyeres 4 mounted in the convertor. Upon completion of this post-treatment, the temperature of the charge had risen from 1,500 to 1,650° C., which latter corresponds to the desired tapping temperature. The iron oxide content of the residual slag had risen only from 14% to 17%. Therefore the heating of the charge could be attributed almost exclusively to the full itilization of the heat of combustion of the fuel oil burned. This was furthermore corroborated by the gas samples taken from the convertor during the post-treatment, which showed that on the average the ratio of $CO_2$ to $CO+CO_2$ amounted to about 0.5. Taking into account the losses in exhaust gases, the computations show a thermal efficiency exceeding 50%, which agrees well with the achieved temperature increase.

In a second example, an increase of 12% in the scrap proportion was achieved in the same convertor under the same initial conditions. As in the prior example, there was first an increase in the scrap proportion by +4%, and the charge had a temperature of 1,550° C. as before. The convertor was tilted and the slag was taken off. This charge was post-treated for six minutes during which a total of 360 kg of fuel oil, 540 $Nm^3$ of $O_2$ and 300 kg of lime dust were blown in through the bottom tuyeres. Approximately 1 minute after the start of post-treatment 2½ tons of scrap in the form of ingot butts were loaded into the convertor. At the end of the 6-minute post-treatment, the additionally loaded scrap was completely molten and a final temperature of 1,650° C. had been achieved. Slag composition was comparable with that in the prior example. However post-charging with scrap, as described herein, is not absolutely required. The total amount of scrap may be added prior to refining. But the heating of the invention occurs only when the higher oxygen contents in the melt which are necessary for the process of this invention have been achieved toward the end of the refining process.

The further experiments relating to the further development of the described invention show how carefully the process must be applied. The following example relates to the application of the process to the continuous melting of scrap.

Scrap or reduced pellets are continuously loaded into an iron bath provided with the heat supply of the invention. The scrap or the pellets may be preheated in part by the exhaust gases. The process may be carried out in various ways. Each time the scrap left in the convertor after tapping a charge may be fused until enough steel has melted in one refining vessel, for instance a convertor, as is required for tapping.

However the process may also be carried out continuously with the steel flowing out of the vessel being heated up from a preferably heated intermediate vessel at the same rate as the scrap is being loaded into it. In these variations of the process, the lime required for slag formation is blown in in powder form together with the oxygen. The process is particularly suitable for melting reduced pellets because the vigorous motion of the bath produced by the introduction of the combustion gases very rapidly melts these pellets. Again the impurities present as an oxidic component in the pellets and consisting principally of silica does not interfere with the process of the invention because of the proper slag composition may be easily adjusted by blowing in the lime dust.

The new process may also be used for the direct prepration of steel from iron ore. In this case ore is continuously added to a melt being heated in conformity with the invention. This ore may be preheated or even partly pre-reduced, in order to still further increase the efficiency of the process. For instance the exhaust gases from this process may be used to preheat and/or pre-reduce the ore. Again, the slag forming agents required for the metallurgical reactions are supplied through the tuyeres and possibly also through the burners to the bath. To prevent excessive oxidation of the bath, it may be appropriate to supply carbonaceous substances independently of the burner and separately to the bath or slag. However even this application of the process of the invention requires that the oxygen content in the bath itself be adjusted in the approximate range of 0.05% for the purpose of reducing ores.

Having now described the invention it is not intended that it be limited, except as may be required by the appended claims.

We claim:

1. A process for increasing the amount of scrap which can be melted in a refining vessel equipped with at least one tuyere comprising at least two concentric pipes mounted in the refractory masonry of the refining vessel underneath the surface of a melt in said vessel to produce a steel melt by supplying thermal energy to said steel melt, which process comprises: introducing a stream of oxygen and a stream of protective medium selected from the group consisting of hydrocarbons and mixtures thereof through said tuyere and into a pig iron melt in said vessel; refining said pig iron melt to a carbon content of not more than 0.05% by blowing oxygen and said hydrocarbon protective medium around said oxygen through said tuyeres and into said melt, the proportions of hydrocarbon to oxygen being such that the tuyere is protected from destructive burnback; and thereafter, after said melt has been refined to a carbon content of not more than about 0.05%, blowing oxygen and carbon-containing fuel into said melt through said tuyere thereby burning said carbon-containing fuel with said oxygen and passing the hot gases resulting from the combustion of said fuel with said oxygen through said melt, the relative proportions of said fuel to said oxygen being substantially greater than the proportion of hydrocarbon to oxygen used to protect said tuyere during said refining and being sufficient to completely burn said fuel so as to produce a hot combustion gas containing substantial amounts of $CO_2$ whereby said melt is heated by passage of said combustion gas through said melt and therefore the amount of scrap which can be melted is increased as compared with that which can be melted in an otherwise similar process, without the additional step of blowing oxygen and said carbon-containing fuel into said melt.

2. A process as defined by claim 1 including supplying fuel and oxygen to said steel melt to furnish a sufficient amount of thermal energy to said steel melt to melt iron carriers selected from the group consisting of scrap, pellets, ore and mixtures thereof, furnished to said melt continuously.

* * * * *